(12) United States Patent
Sato

(10) Patent No.: US 8,546,978 B2
(45) Date of Patent: Oct. 1, 2013

(54) ELECTRIC CIRCUIT DEVICE

(75) Inventor: Tomio Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 938 days.

(21) Appl. No.: 12/369,355

(22) Filed: Feb. 11, 2009

(65) Prior Publication Data

US 2009/0206673 A1 Aug. 20, 2009

(30) Foreign Application Priority Data

Feb. 20, 2008 (JP) .................................. 08-038677

(51) Int. Cl.
*H02J 1/00* (2006.01)
*H02J 3/00* (2006.01)

(52) U.S. Cl.
USPC ............................................. 307/80; 327/544

(58) Field of Classification Search
None
See application file for complete search history.

(56) References Cited

U.S. PATENT DOCUMENTS

| | | | | |
|---|---|---|---|---|
| 3,859,638 | A * | 1/1975 | Hume, Jr. ....................... | 365/229 |
| 6,455,901 | B2 * | 9/2002 | Kameyama et al. ........... | 257/371 |
| 6,798,086 | B2 * | 9/2004 | Utsunomiya ................... | 307/154 |
| 6,803,553 | B1 * | 10/2004 | Tian ............................ | 250/208.1 |
| 2002/0175715 | A1 * | 11/2002 | Nii ................................. | 327/77 |
| 2002/0196054 | A1 * | 12/2002 | Ohkido .......................... | 327/65 |
| 2003/0011247 | A1 * | 1/2003 | Kajiwara et al. ............... | 307/125 |
| 2003/0016060 | A1 * | 1/2003 | Tam ................................ | 327/63 |
| 2005/0242787 | A1 * | 11/2005 | Shirokoshi et al. ........... | 323/222 |
| 2007/0013234 | A1 * | 1/2007 | Ting .............................. | 307/112 |
| 2008/0061858 | A1 * | 3/2008 | Cao et al. ...................... | 327/337 |
| 2008/0238492 | A1 * | 10/2008 | Junus et al. .................... | 327/82 |

FOREIGN PATENT DOCUMENTS

| | | |
|---|---|---|
| JP | 10-107210 A | 4/1998 |
| JP | 2000-31804 A | 1/2000 |

OTHER PUBLICATIONS

WO Pub 2005088816 to Oki et al., english translation, Sep. 22, 2005.*
Fukuoka, Kazuki et al., "A 1.92us-wake-up time thick-gate-oxide power switch technique for ultra low-power single-chip mobile processors", *Symposium on VLSI Circuits Digest of Technical Papers* 2007, 128-129.

* cited by examiner

*Primary Examiner* — Hal Kaplan
(74) *Attorney, Agent, or Firm* — Fujitsu Patent Center

(57) ABSTRACT

According to an aspect of an embodiment, an electric circuit device includes: a first and second voltage supply units to be applied with a first and second voltages, respectively; a first capacitor connected to the first voltage supply unit; a first switch connected between the first voltage supplying unit and the first capacitor; a first load circuit connected to the second voltage supply unit; a second switch connected between the second voltage supply unit and the first load circuit; a third switch connected to connect the first capacitor with the first load circuit; and a switch controller for turning on either the third switch or the first switch, and for turning off the third switch while the second switch is turned on.

12 Claims, 5 Drawing Sheets

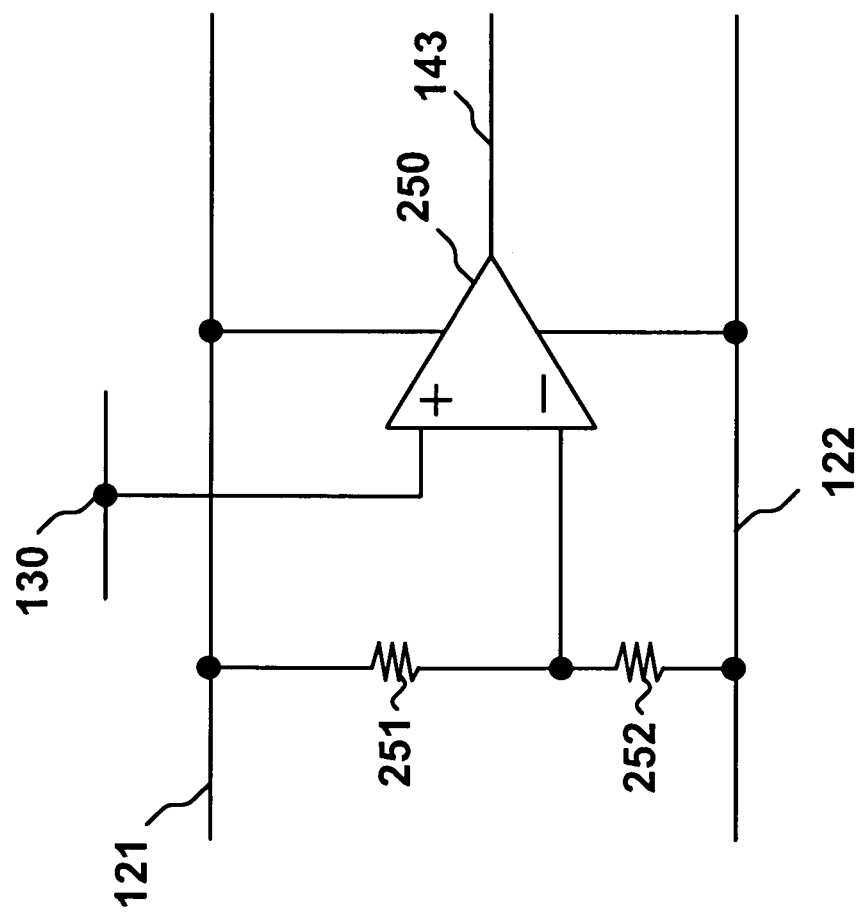

ELECTRIC CIRCUIT DEVICE

CROSS-REFERENCE TO RELATED APPLICATION

This application is based upon and claims the benefit of priority of the prior Japanese Patent Application No. 2008-038677 filed on Feb. 20, 2008, the entire contents of which are incorporated herein by reference.

BACKGROUND

1. Field

This art relates to an electric circuit device for supplying electric power to an internal circuit in a semiconductor circuit.

2. Description of the Related Art

Power source cut-off function is one of the functions for reducing power consumption of a semiconductor integrated circuit used for an electronic apparatus. The power source cut-off function is a function for stopping supplying power source to a particular block in an internal circuit that is in a standby state. Herewith, needless power consumption of the particular block that is in a standby state can be reduced to elongate the continuous operation time of the electronic apparatus.

In order to stabilize the operation of the internal circuit, a capacitor for stabilizing power source voltage is generally connected in parallel with the internal circuit. When the connection between the internal circuit and a power source is cut off, the connection between the capacitor and power source is also cut off at the same time. On the other hand, the internal circuit and the capacitor are always connected, so that when the connection with the power source is cut off, the electric charge of the capacitor is discharged by the internal circuit. Consequently, when the internal circuit and the power source are connected again, it is necessary to charge the capacitor. Consequently, the power source voltage is rapidly lowered to destabilize the operation of the internal circuit.

A technique has been known by which rapid power source voltage fluctuation is prevented when activating the internal circuit by gradually increasing the gate voltage of a MOS switch that connects the internal circuit and the power source when activating the internal circuit. The technique is disclosed in, for example, K. Fukuoka et al., "A 1.92us-wake-up time thick-gate-oxide power switch technique for ultra low-power signal-chip mobile processors", Symposium on VLSI Circuits Digest of Technical Papers, pp. 128-129, 2007.

SUMMARY

According to an aspect of an embodiment, an electric circuit device includes: a first and second voltage supply units to be applied with a first and second voltages, respectively; a first capacitor connected to the first voltage supply unit; a first switch connected between the first voltage supplying unit and the first capacitor; a first load circuit connected to the second voltage supply unit; a second switch connected between the second voltage supply unit and the first load circuit; a third switch connected to connect the first capacitor with the first load circuit; and a switch controller for turning on either the third switch or the first switch, and for turning off the third switch while the second switch is turned on.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a circuit diagram illustrating a voltage detection unit.

DESCRIPTION OF THE PREFERRED EMBODIMENTS

Figure 1A:
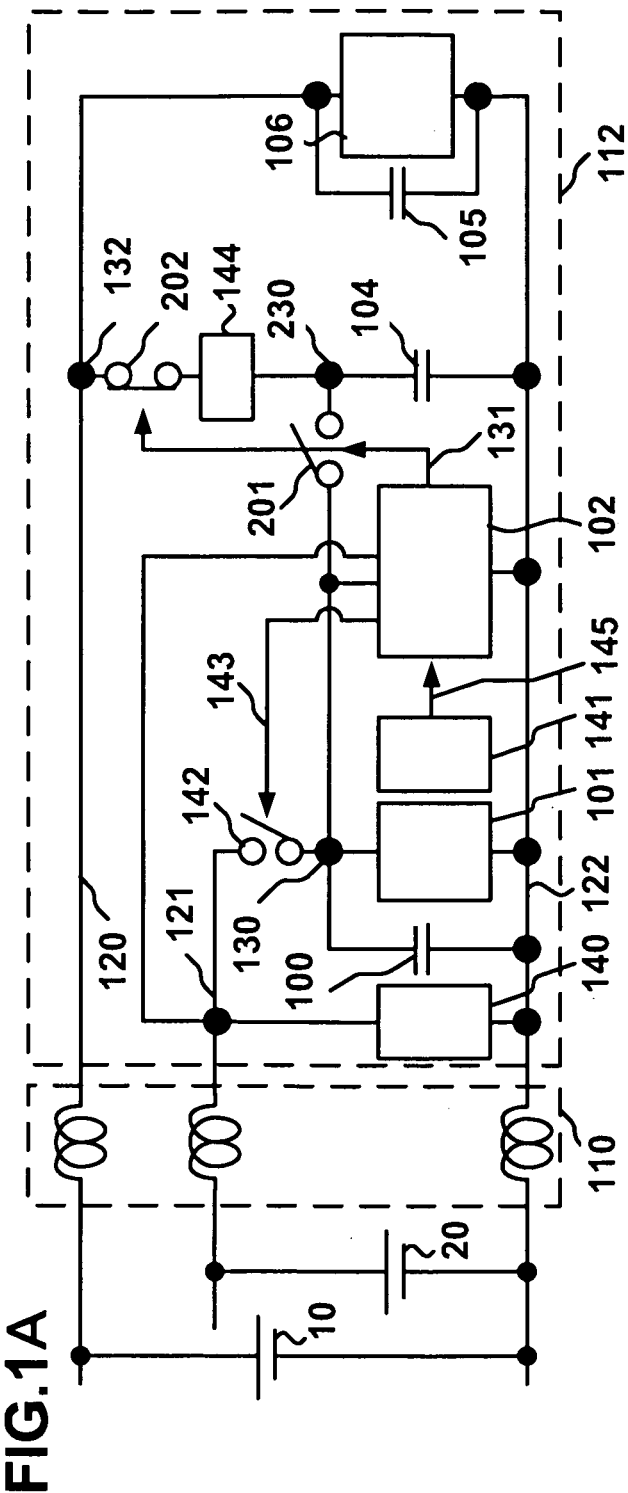
FIG. 1A is a circuit diagram illustrating a semiconductor device.
Figure 1B:
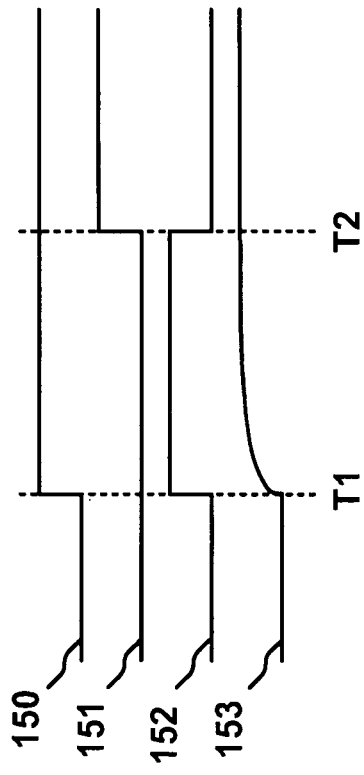
FIG. 1B is a diagram illustrating operational waveforms of the semiconductor device.

FIG. 1A is a diagram illustrating a semiconductor device in which an electric circuit device according to the embodiment is mounted. The semiconductor device includes a plurality of elements. These elements may be indirectly connected through other elements. FIG. 1B is a diagram illustrating operational waveforms of the semiconductor device of FIG. 1A. The semiconductor device includes a package 110 and a semiconductor circuit 112. The package 110 is the one in which an inductance component caused by a package such as a lead frame of a package portion of the semiconductor device is expressed as an equivalent circuit. The semiconductor device includes a voltage supply unit 120, a voltage supply unit 121, and a voltage supply units 122 for supplying power source. Note that the voltage supply unit may be a wiring. A voltage 10 is supplied to the voltage supply unit 120 and a voltage 20 is supplied to the voltage supply unit 121. The voltage supply unit 122 is the reference of the voltage 10 and the voltage 20. The voltage 10 is not less than the voltage 20.

The semiconductor circuit 112 includes internal circuits 101, 106, 140, a control unit 141, a switch controller 102, switches 142, 201, 202, a current limiter 144, and capacitors 100, 104, 105. The switch controller 102 includes a voltage detection unit. The voltage detection unit is disclosed in FIG. 4 of U.S. patent application Ser. No. 12/199,493, which is expressly incorporated herein by reference.

A power source terminal and a ground terminal of the internal circuit 101 are respectively connected to the voltage supply units 121, 122. The capacitor 100 is connected in parallel with the internal circuit 101.

The internal circuit 101 is a logic circuit which is a targeted of a power cut-off processing. A target of power supply is not limited to the internal circuit, and may be a load circuit including a circuit mounted on a print circuit substrate. The capacitor 100 is not limited to a decoupling capacitor, and a component of a wiring capacitance between the voltage supply unit 121 and the voltage supply unit 122 or a capacitance component owned by the entire internal circuit 101 may be an alternative thereof. The internal circuit 140 is connected between the voltage supply unit 121 and the voltage supply unit 122. The internal circuit 106 and the capacitor 105 are connected between the voltage supply unit 120 and the voltage supply unit 122. The capacitor 105 may be a component of a wiring capacitance between the voltage supply unit 120 and the voltage supply unit 122 or a capacitance component owned by the internal circuit 106. In the general semiconductor circuit 112, for example, the internal circuit 101 and the internal circuit 140 is a core unit, and the internal circuit 106 is an I/O unit. In the case where the semiconductor device is operated at a high speed, the power supply voltage of the I/O unit is higher than the power supply voltage of the core unit in many cases.

The switch controller 102 is connected between the voltage supply unit 121 and the voltage supply unit 122, and outputs signals 131, 143 based on a signal 145 transmitted from the control unit 141. The control unit 141 controls a timing at which power source is supplied to the internal circuit 101. The capacitor 104 is connected between the voltage supply unit 120 and the voltage supply unit 122. The switch 142 is connected between the voltage supply unit 121 and a terminal 130. The switch 201 is connected between a terminal 230 and the terminal 130. The switch 202 is connected between a terminal 132 and the terminal 230.

The switches 142, 201, and 202 perform on/off operation in accordance with the signals 131, 143 output from the switch controller 102. Each of the switches can be provided by using, for example, a MOS transistor. The current limiter 144 is mounted between the switch 202 and the capacitor 104.

The current limiter 144 limits an amount of a current flowed in the terminal 230 from the terminal 132, and is capable of preventing that the voltage value of the terminal is rapidly lowered when the switch 202 is turned on. The current limiter 144 may be provided by an on-resistance of transistor. When the switch 202 is provided by a MOS transistor, the current limiter 144 may be the MOS transistor in state of on. The on-resistance limits the current from the drain to the source of the MOS transistor.

In FIG. 1B, the waveform 150 illustrates a voltage waveform of the signal 145, the waveform 151 illustrates a voltage waveform of the signal 143, the waveform 152 illustrates a voltage waveform of the signal 131, and the waveform 153 illustrates a voltage waveform 153 of the terminal 130, respectively. Hereinafter, an operation of the circuit will be described.

As initial states, the switch 202 is in on state and the switches 142, 201 are in off states. Herein, the capacitor 104 is charged by the voltage 10 supplied to the voltage supply unit 120. When the waveform 150 of the signal 145 becomes "1" at the time T1 of FIG. 1B, the switch controller 102 outputs the signal 131 that turns the switch 201 on and the switch 202 off as the waveform 152. The reason that the switch 202 is turned off simultaneously when the switch 201 is turned on is to prevent short circuit between the voltage supply unit 120 and the voltage supply unit 121 when the switch 142 is turned on.

When the switch 201 is turned on, the electric charge charged in the capacitor 104 is moved to the capacitor 100. Herewith, the voltage of the terminal 130 is gradually increased as the waveform 153. If the capacitance value of the capacitor 100 is C1, the capacitance value of the capacitor 104 is C2, and the on-resistance value of the switch is R1, a charging time t of the capacitor 100 can be obtained by the following equation as a time constant of the series circuit of the capacitor 100, the capacitor 104, and the switch 201.

$$t = R1 \times C1 \times C2 \div (C1+C2)$$

Accordingly, the time for activate the internal circuit 101 can be reduced as the C1, C2 or R1 becomes smaller.

The switch controller 102 outputs "1" at the time T2 as the signal 143 as the waveform 151. It is preferable that the difference (T2−T1) between the time T2 and the time T1 is about the triple of the charging time t. This is because that the capacitor 100 is fully charged if a time of about the triple of the charging time t is passed. Variation of the voltage 20 can be restrained to a smaller value as the difference between the voltage value of the voltage 20 and the voltage value of the terminal 130 becomes smaller. Specifically, the switch controller 102 is to be designed so that the signal 131 is output at the same time when the signal 145 is input and the signal 143 is output after it is confirmed that the time of 3×t is passed by a timer.

After the voltage value of the terminal 130 is fully increased, the switch controller 102 outputs the signal 143. The switch 142 is turned on after receiving the signal 143. Accordingly, the voltage 20 is supplied to the internal circuit 101. That is, after the capacitor 100 is charged with the capacitor 104, the voltage 20 is supplied to the internal circuit 101. The capacitor 100 is in a charged state, so that a time during which the voltage 20 is stabilized when the switch is turned on, that is a waiting time for charging the capacitor 100 becomes unnecessary. Accordingly, supply of power source to the internal circuit can be restored at a high speed while preventing lowering of the power source voltage when supplying the voltage 20 to the internal circuit.

The capacitor 104 is charged by the voltage 10 having a voltage value of not less than that of the voltage 20. Accordingly, if the capacitance value of the capacitor 104 is too large, the voltage value at the terminal 130 when the switch 201 is turned on becomes higher than the voltage value of the voltage 20. Also in this case, a noise is generated in the voltage 20 at the moment when the switch 142 is closed, causing prevention of high speed activation of the internal circuit 101.

Since electric charge is conserved before and after the switch 201 is turned on, if the voltage value of the voltage 10 is V1 and the voltage value of the voltage 20 is V2, the following equation is satisfied.

$$C2 \times V1 = (C1+C2) \times V2$$

Accordingly, the capacitance value C2 of the capacitor 104 by which the voltage value of the terminal 130 becomes V2 after the switch 201 is turned on can be obtained by dividing the product of the capacitance value C1 of the capacitor 100 and V2 by the difference between V2 and V1 as the following equation.

$$C2 = C1 \times V2 \div (V2-V1)$$

Further, C2 can be reduced as the voltage value V1 becomes larger with respect to the voltage value V2. Accordingly, the mounting area of C2 can be reduced by reducing C2.

Even when the capacitance value C2 is not the optimum value, the timing at which the switch 142 is turned on can be optimized by mounting the voltage detection unit having a function for monitoring the voltage value of the terminal 130 in the switch controller 102.

FIG. 2 is a circuit diagram illustrating the voltage detection unit mounted in the switch controller 102. The voltage detection unit includes an operational amplifier 250, a resistor 251, and a resistor 252. In the embodiment, a voltage obtained by dividing the voltage 20 by the resistances 251, 252 is input to the negative feedback input of the operational amplifier 250. Alternatively, the voltage supply unit 121 may be directly connected to the negative feedback input. The positive feedback input of the operation amplifier 250 is connected to the terminal 130. When the voltage value of the terminal 130 becomes not less than the voltage value of the negative feedback input of the operational amplifier 250, the signal 143 that turns on the switch 142 is output from the operational amplifier 250.

When the capacitance value C2 is smaller than the optimum value, the voltage value of the terminal 130 does not increase to V2. Even in this case, by adjusting the ratio of the resistance values of the resistors 251, 252, the switch 142 can be turned on. For example, by adjusting the ratio of the resistance values of the resistors 251, 252 to become 1:9, the signal 143 can be output at the time when the voltage value of the terminal 130 is increased to 0.9×V2. In this case, a difference between the voltage value of the voltage 20 and the voltage value of the terminal 130 is also small. Accordingly, supply of power source to the internal circuit can be restored at a high speed while preventing lowering of the power source voltage when connecting the voltage 20 to the internal circuit.

Further, the switch 142 may be turned on at the time when the switch 201 is turned on. In this case, the switch 202 is turned off and the capacitor 104 charged by the voltage 10 is connected to the internal circuit 101 and the capacitor 100. Herewith, charging of the capacitor 100 by the voltage 20 can be compensated by the capacitor 104. As a result, a time required for charging the capacitor 100 can be reduced to restrain lowering of the voltage of the voltage supply unit 121.

Figure 3:
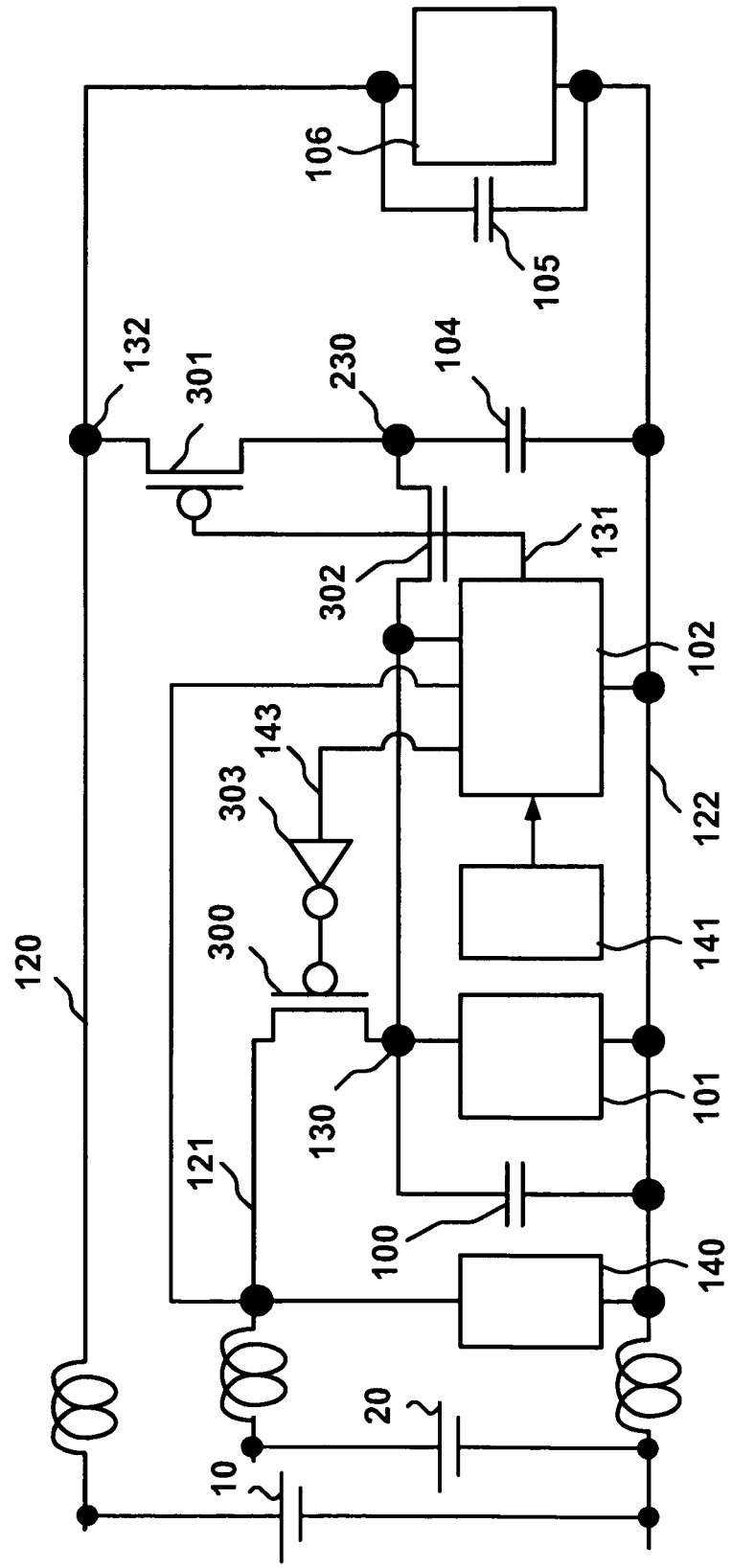
FIG. 3 is a circuit diagram illustrating a semiconductor device.

FIG. 3 is a diagram illustrating the semiconductor device in which the switches 142, 201, and 202 of FIG. 1 are provided by MOS transistors. In FIG. 3, the same reference numerals are used to denote the same elements as in FIG. 1, and descriptions thereof will be omitted. Each of reference numerals 300, 301 denotes a P-type MOS transistor, reference numeral 302 denotes an N-type MOS transistor, and reference numeral 303 denotes a NOT circuit.

In FIG. 3, the N-type MOS transistor 302 corresponds to the switch 201 of FIG. 1, and the P-type MOS transistor 301 corresponds to the switch 202 of FIG. 1. Further, the P-type MOS transistor 300 corresponds to the switch 142. The source of the transistor 302 is connected at the terminal 130 side, and the drain is connected to the terminal 230 side. Further, the source of the transistor 301 is connected to the terminal side 230, and the drain is connected to the terminal 132 side. The gate of the transistor 301 and the gate of the transistor 302 are electrically connected, and also connected to the switch controller 102. The source of the transistor 300 is connected to the voltage supply unit 121, and the drain is connected to the terminal 130. The gate is connected to the switch controller 102 via the NOT circuit 303.

Each of the transistors 300, 301, and 302 has an on-resistance. The on-resistance value of the transistor is determined by the channel width or the channel length of the transistor. The on-resistance value of the transistor 300 determines the amount of the current supplied to the internal circuit 101. The on-resistance of the transistor 302 determines a time for charging the capacitor 100. The on-resistance of the transistor 301 determines a time for charging the capacitor 104 and corresponds to the current control unit 144 of FIG. 1.

If the on-resistance value R2 of the transistor 301 is too small, the value of the current flowed in the capacitor 104 when the transistor 301 is turned on becomes large, and the voltage change of the terminal 132 becomes large. Further, if R2 is too large, the value of the current flowed in the capacitor 104 becomes small, and it becomes impossible to charge the capacitor 104 during from when the switch controller turns off the transistor 300 to when turns on again. Accordingly, it should be designed so that the product of the capacitance value C2 of the capacitor 104 and the resistance value R2 is not more than the time from when the transistor 300 is turned off to when the transistor 300 is turned on again. Herewith, the time for charging the capacitor 104 can be assured, so that the voltage value of the terminal 130 can be fully increased before the switch 142 is turned on to activate the internal circuit 101 at a high speed. Further, by limiting the value of the current flowed in the capacitor 104, voltage reduction of the terminal 132 can be restrained to a minimum level.

Figure 4:
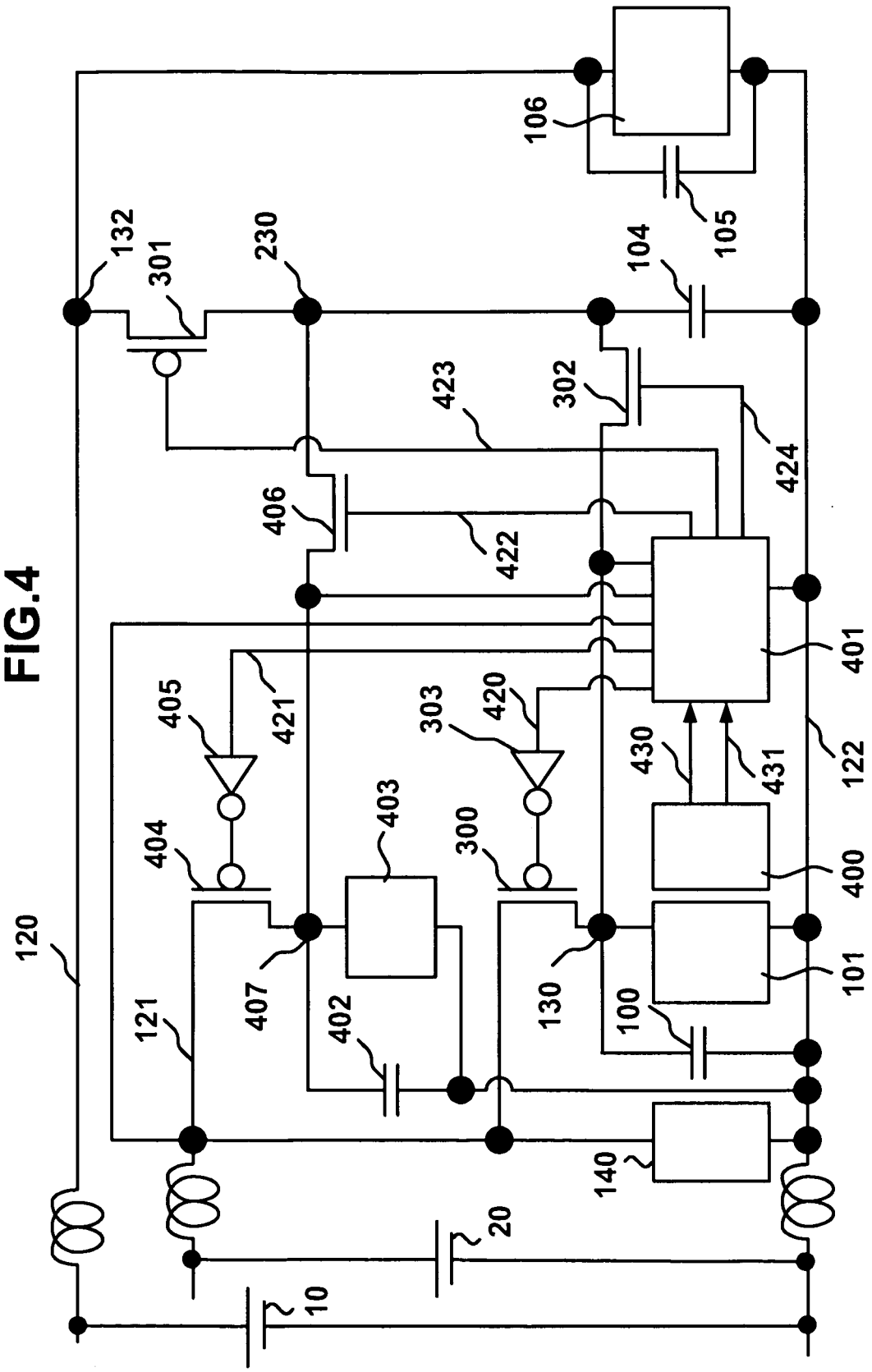
FIG. 4 is a circuit diagram illustrating a semiconductor device.

FIG. 4 is a semiconductor device in which an electronic circuit device for providing control of power source of a plurality of internal circuits is mounted. In FIG. 4, the same reference numerals are used to denote the same elements as in FIG. 3, and descriptions thereof will be omitted.

The semiconductor device of FIG. 4 includes a P-type MOS transistor 404 and an N-type MOS transistor 406 in order to perform power cut-off control of an internal circuit 403. The gate of the transistor 404 is connected a switch controller 401, and controlled by a signal 421. A NOT circuit 405 is connected between the transistor 404 and the switch controller 401. The gate of the transistor 406 is connected to the switch controller 401, and is controlled by a signal 422. A capacitor 402 is connected in parallel with the internal circuit 403. The capacitor 402 is not limited to a decoupling capacitor, and a component of a wiring capacitance between the voltage supply unit 121 and the voltage supply unit 122 or a capacitance component owned by the internal circuit 403 may be an alternative thereof.

The transistors 301, 302 are controlled by signals 423, 424 individually output from the switch controller 401. Signals 430, 431 are signals that are input to the switch controller 401 from a control unit 400 in order to control the internal circuits 101, 403. The control unit 400 controls timing for activating the internal circuits 101, 403. The control unit 400 may be provided by using a PMU.

The capacitor 104 is commonly used for power source control operation for the internal circuits 101, 403. Accordingly, if the time from when the transistor 300 is turned off to when the transistor 404 is turned on is too short, a sufficient charging time can not be assured for the capacitor 104. Accordingly, a predetermined delay time to be described below is necessary between when the signal 430 is output from the control unit 400 and when the signal 431 is output therefrom. By commonly using the capacitor 104, increase of the area when the capacitor is mounted on the semiconductor circuit can be prevented.

Figure 5:
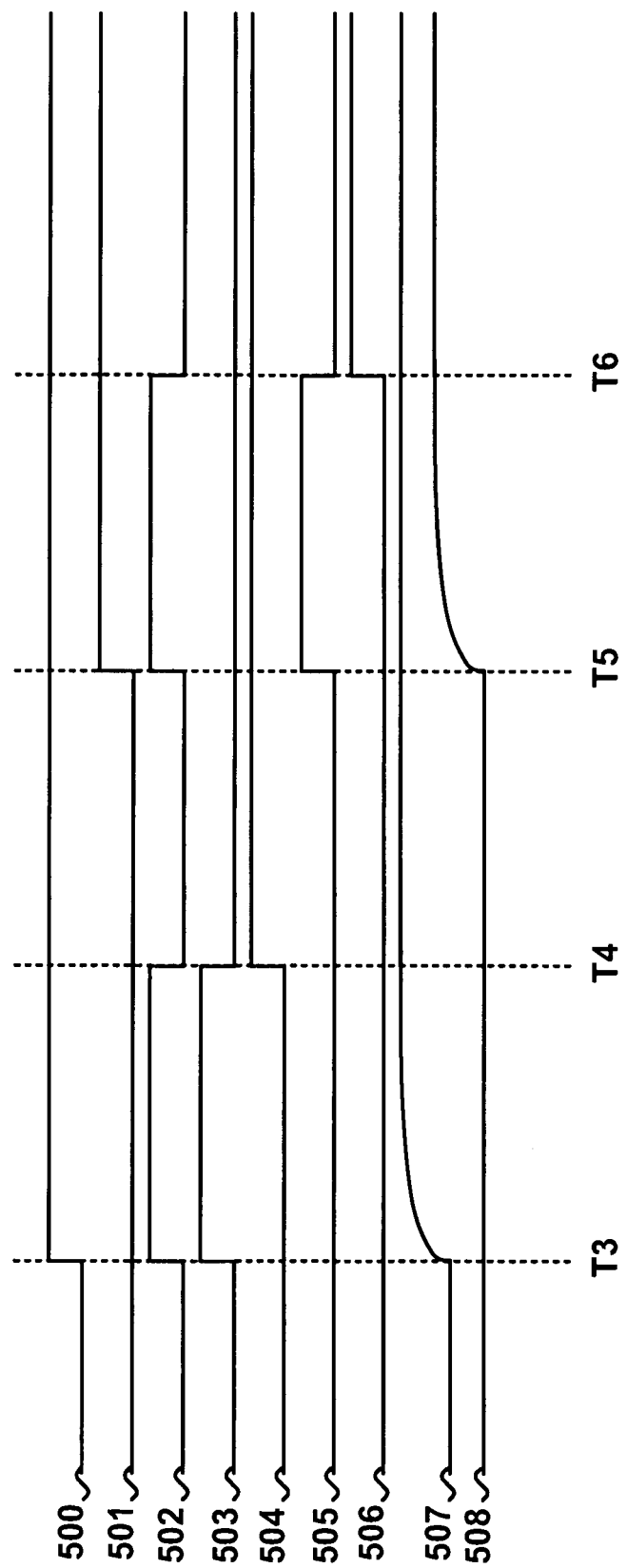
FIG. 5 is a time chart diagram.

FIG. 5 is a time chart diagram illustrating operation of the electronic circuit device of the semiconductor device of FIG. 4. The waveform 500 illustrates the signal 430, and the waveform 501 illustrates the signal 431. The waveform 502 illustrates the signal 423, and the waveform 503 illustrates the signal 424. The waveform 504 illustrates a signal 420, and the waveform 505 illustrates the signal 422. The waveform 506 illustrates the signal 421, and the waveform 507 illustrates a voltage value at the terminal 130, and the waveform 508 illustrates a voltage value at a terminal 407, respectively.

The logical value of the signal 430 at the time T3 of FIG. 5 is set to "1" as the waveform 500, and at the same time, the logical values of the signals 423, 424 is set to "1" as the waveforms 502, 503. Herewith, the transistor 301 is turned off and the transistor 302 is turned on. Electric charge charged in the capacitor 104 is flowed in the capacitor 100 to increase the voltage of the terminal 130 as the waveform 507. As described above, the time for charging the capacitor 100 is determined by C1×C2×R1÷(C1+C2) which is a time constant obtained by the capacitance value C1 of the capacitor 100, the capacitance value C2 of the capacitor 104, and the resistance value R1 of the transistor 302. The time from the time T3 to the time T4 shall be 3×C1×C2×R1÷(C1+C2).

Since the voltage value of the terminal 130 is sufficiently high at the time T4 of FIG. 5, the logic values of the signals 423, 424 are set to "0" as the waveforms 502, 503, and the logic value of the signal 420 is set to "1" as the waveform 504. Since the transistor 302 is turned off and the transistors 300, 301 are turned on, supply of the voltage 20 to the internal circuit 101 is started, and charging of the capacitor 104 is started by the voltage 10.

The time from the time T4 to the time T5 is set larger than the charging time of the capacitor 104. The charging time of the capacitor 104 is determined by C2×R2 which is the product of the on-resistance value R2 of the transistor 301 and the capacitance value C2 of the capacitor 104 as described above. The preparation for charging of the capacitor connected in parallel with another internal circuit is completed when a time not less than the time C2×R2 is passed.

The logical value of the signal 431 at the time T5 of FIG. 5 is set to "1" as the waveform 501, and at the same time, the logical values of the signals 423, 422 are set to "1" as the waveforms 502, 505. Herewith, the transistor 301 is turned off and the transistor 406 is turned on. Electric charge charged in the capacitor 104 is flowed in the capacitor 402 to increase the voltage of the terminal 407 as the waveform 508. The time for charging the capacitor 402 with the capacitor 104 is determined by C2×C3×R3÷(C2+C3) if the capacitance value of the capacitor 104 is C2, the capacitance value of the capacitor 402 is C3, and the resistance value of the transistor 406 is R3. The time from the time T5 to the time T6 shall be 3×C2×C3×R3÷(C2+C3).

Since the voltage value of the terminal 407 is sufficiently high at the time T6 of FIG. 5, the logic values of the signals 423, 422 are set to "0" as the waveforms 502, 505, and the logic value of the signal 421 is set to "1" as the waveform 506. Since the transistor 406 is turned off and the transistors 404, 301 are turned on, supply of the voltage 20 to the internal circuit 403 is started, and charging of the capacitor 104 is started by the voltage 10.

Accordingly, by setting a differential of the time when the logical value of the signal 430 becomes "1" and the time when the logical value of the signal 431 becomes "1" so as to be longer than the time (T7+T8) which is the sum of the charging time T7 of the capacitors that are connected in parallel with each of the internal circuits and the charging time T8 of the capacitor 104, the capacitor 104 can be commonly used. Further, when the signals 430, 431 do not satisfy the condition, a differential of the signals may be detected by the switch controller 401 to delay one of the signals to satisfy the condition.

Charging of the capacitor 100 and the capacitor 402 is respectively performed by using the capacitor 104. Accordingly, by setting the capacitance values of the capacitors 100, 402 to the same value, each capacitor can be charged so that the voltage values of the terminals 130 and 407 when connected to the voltage 20 become the same.

Further, a voltage detection unit for detecting the voltage values of the terminal 130 and the terminal 407 may be provided in the switch controller 401. Specifically, the voltage detection unit of FIG. 2 is mounted in the switch controller 401 in accordance with the number of the internal circuits to detect the voltage values of the terminals 130, 407. The switches 300, 404 are turned on in accordance with the comparative result of the detected voltage values and a threshold value set in the voltage detection unit. Herewith, the timing when the switches 300, 404 are turned on can be optimized without optimizing the capacitance values of the capacitors 100, 402. Note that a combination of the structures of the embodiments is also included in an embodiment of the invention.

What is claimed is:

1. An electric circuit device comprising:
    a first voltage supply unit and a second voltage supply unit to be applied with a first voltage and a second voltage, respectively;
    a first capacitor connected to the first voltage supply unit;
    a first switch, provided between the first voltage supplying unit and the first capacitor, to connect the first voltage supplying unit to the first capacitor by becoming a conductive state;
    a first load circuit connected to the second voltage supply unit;
    a second switch to connect the second voltage supply unit to the first load circuit;
    a third switch, provided between the first capacitor and the first load circuit, to connect the first capacitor to the first load circuit by becoming a conductive state; and
    a switch controller to turn on the second switch after turning on the third switch and turning off the first switch.

2. The electric circuit device of claim 1, wherein the first voltage is larger than the second voltage.

3. The electric circuit device of claim 1, wherein the switch controller turns on the second switch when a voltage of the first load circuit impressed is not less than a predetermined value.

4. The electric circuit device of claim 1 further comprising a current limiter to limit the current through the first switch.

5. The electric circuit device of claim 4, wherein the first switch includes a transistor, and the current limiter includes the transistor in an on state.

6. The electric circuit device of claim 5, wherein a value which is obtained by multiplying a resistance of the transistor in an on state and a capacitance of the first capacitor is less than a time duration between turning off the second switch and turning the second switch on again.

7. The electric circuit device of claim 1, wherein a first capacitance of the first capacitor is a value which is obtained by dividing a result with a difference between the first voltage and the second voltage, the result being obtained by multiplying a second capacitance of the second capacitor by the second voltage.

8. The electric circuit device of claim 7, wherein the second switch turns on when a time passes after the third switch is turned on, the time being not less than a value which is obtained by dividing a value, which is obtained by multiplying the first capacitance, the second capacitance and an on-resistance of the third switch, by a sum of the first capacitance and the second capacitance.

9. An electric circuit device comprising:
    a first voltage supply unit and a second voltage supply unit to be applied with a first voltage and a second voltage, respectively;
    a first capacitor connected to the first voltage supply unit;
    a first switch to connect the first voltage supplying unit to the first capacitor;
    a first load circuit connected to the second voltage supply unit;
    a second switch to connect the second voltage supply unit to the first load circuit;
    a third switch to connect the first capacitor with the first load circuit;
    a switch controller to turn on the second switch after turning on the third switch and turning off the first switch;
    a fourth load circuit connected to the second voltage supply unit;
    a fourth switch to connect the second load circuit to the second voltage supply unit; and a fifth switch to connect the first capacitor to the fourth circuit;

wherein the switch controller turns off one of the second and the third switches when another turns on.

10. The electric circuit device of claim 9, wherein the switch controller turns on the second switch when a voltage impressed to the first load circuit becomes not less than a predetermined value, and turns on the fourth switch when a voltage impressed to the second load circuit becomes not less than a predetermined value.

11. An electric circuit device comprising:

a first capacitor connected to a first voltage supply unit impressed a first voltage;

a first switch, provided between the first voltage supplying unit and the first capacitor, to connect the first voltage supplying unit to the first capacitor by becoming a conductive state;

a first load circuit connected to a second voltage supply unit impressed a second voltage;

a second switch to connect the second voltage supply unit to the first load circuit;

a third switch, provided between the first capacitor and the first load circuit, to connect the first capacitor to the first load circuit by becoming a conductive state;

a switch controller to turn on the second switch after turning on the third switch and turning off the first switch; and a second load circuit connected to the first voltage supply unit.

12. The electric circuit device of claim 11 further comprising a third circuit connected to the second voltage supply unit.

* * * * *

UNITED STATES PATENT AND TRADEMARK OFFICE
CERTIFICATE OF CORRECTION

| | | |
|---|---|---|
| PATENT NO. | : 8,546,978 B2 | Page 1 of 1 |
| APPLICATION NO. | : 12/369355 | |
| DATED | : October 1, 2013 | |
| INVENTOR(S) | : Tomio Sato | |

It is certified that error appears in the above-identified patent and that said Letters Patent is hereby corrected as shown below:

On the Left hand Column of the Title page of the Patent, the Foreign Application Priority Data should be corrected as shown below:

Item -- (30) Foreign Application Priority Data

Feb. 20, 2008   (JP) ...............................2008-038677 --

Signed and Sealed this
Twenty-second Day of April, 2014

Michelle K. Lee
*Deputy Director of the United States Patent and Trademark Office*